(12) United States Patent
Lemke et al.

(10) Patent No.: US 7,141,119 B2
(45) Date of Patent: Nov. 28, 2006

(54) PRESSURE-CONTROLLING DISPERSION DELIVERY SYSTEM

(75) Inventors: Travis A. Lemke, Lino Lakes, MN (US); Mark Serafin, Apple Valley, MN (US)

(73) Assignee: Imation Corp., Oakdale, MN (US)

( * ) Notice: Subject to any disclaimer, the term of this patent is extended or adjusted under 35 U.S.C. 154(b) by 338 days.

(21) Appl. No.: 10/441,427

(22) Filed: May 19, 2003

(65) Prior Publication Data

US 2004/0234681 A1 Nov. 25, 2004

(51) Int. Cl.
*B05C 11/00* (2006.01)

(52) U.S. Cl. .............. 118/692; 118/695; 427/128; 427/129; 239/63; 222/71

(58) Field of Classification Search ............ 427/129, 427/128; 118/693, 695; 239/63; 222/71
See application file for complete search history.

(56) References Cited

U.S. PATENT DOCUMENTS

| | | | |
|---|---|---|---|
| 4,828,779 A | 5/1989 | Hiraki et al. | |
| 5,209,954 A | 5/1993 | Takahashi et al. | |
| 5,433,878 A * | 7/1995 | Arai et al. | 252/62.63 |
| 5,576,075 A | 11/1996 | Kawasaki et al. | |
| 5,582,645 A | 12/1996 | Trest et al. | |
| 5,628,827 A * | 5/1997 | McCollam et al. | 118/695 |
| 5,705,605 A | 1/1998 | Tittmann et al. | |
| 6,210,757 B1 * | 4/2001 | Taylor et al. | 427/356 |
| 6,558,134 B1 | 5/2003 | Serafin et al. | |
| 2002/0029740 A1 * | 3/2002 | McLoughlin et al. | 118/313 |

* cited by examiner

*Primary Examiner*—Alain L. Bashore
(74) *Attorney, Agent, or Firm*—Eric D. Levinson

(57) ABSTRACT

A pressure-controlling dispersion delivery system for delivering a sheared dispersion comprising a plurality of ingredients to a coating device selected from a direct feed delivery system and a coating device flow-through delivery system, wherein a coating formed from a dispersion delivered through the pressure-controlling delivery system has a more consistent caliper than a coating formed from a similar sheared dispersion delivered to a coating device by means of a gear pump delivery system.

18 Claims, 6 Drawing Sheets

PRESSURE-CONTROLLING DISPERSION DELIVERY SYSTEM

THE FIELD OF THE INVENTION

The present invention generally relates to a pressure-controlling dispersion delivery system and a method of delivering coating dispersions, more specifically to a pressure-controlling delivery system and method that minimizes variation in the thickness of coatings formed from fluids delivered under high pressure.

BACKGROUND OF THE INVENTION

Fluid compositions are coated onto substrates for use in a wide variety of applications. Some of those applications require the compositions to be coated very thinly on the substrates; many of such compositions are formed into high viscosity fluids such as dispersions or emulsions. In order to process dispersions, emulsions and other high viscosity coatings, the processing system must provide high uniform energy to disperse the agglomerate structure in such materials. Pulsation, or the application of non-uniform energy, will result in some of the product experiencing insufficient processing, which cannot be cured by increasing the processing time. Such pulsations in fluid processing systems have been addressed by the development of high intensifier shear devices, such as those disclosed in U.S. Pat. No. 6,558,134. However, after the processing/shearing of the fluid is completed, the fluid must then be delivered to a coating device, for example, a coating die.

Current dispersion delivery systems utilize a gear pump to meter the dispersion to the coating device. Balancing the metering of the flow can be very difficult, especially in low flow situations. Pressure fluctuations, or pulsations caused by the gear pump(s), can lead to undesirable coating caliper variations, especially in applications requiring precise and high pressure delivery of thin coatings. For thin coatings, the coating calipers are small. This means that very small amounts of the dispersion are delivered to the coating device at a time; i.e., the delivery systems have very low flow. This low flow lengthens the waiting time between the shearing step and the coating steps, which can cause degradation of sheared material. The low flow situation also makes control of the coating thickness and weight more difficult. One problem can occur when such small amounts are involved. Normal pressure variations in the delivery system pumps result in significant variations in the amount of the fluid provided to the coating die. These variations in the fluid delivery can result in significant variations in the caliper of the coatings, and thus unacceptable defects.

Various dispersion delivery systems have been proposed or attempted to control the coating thickness, to varying degrees of success, and sometimes creating other problems. One system to improve the flow, while still balancing the metering is disclosed in EP 0435351 A1. This delivery system uses gear pumps which provide metering into the system of excess flow which goes to the coating die, followed by metering out the excess flow at or just prior to contact with the coating web.

One specific application for thin precise coating(s) on a substrate is for use as magnetic recording layers or support layers for magnetic recording layers. Such formulations are typically magnetic or electroconductive or other particles dispersed in binder systems with various adjuvants, such as lubricants and head cleaning agents (HCA). Variations in coating caliper for magnetic recording media adversely affect the data quality delivered of the recording media. The formulations, and dispersions made therefrom, are proprietary to the magnetic recording manufacturers, and vary with the type and variation of magnetic media produced. However, the density of recording in magnetic recording media has become higher in recent years, requiring higher quality formulations and coatings.

It would be desirable to have a dispersion delivery system which, when used in conjunction with a high intensifier shear system, would provide consistent amounts of material to the coating device and thus reduce variations in the subsequent coatings. It would also be advantageous if such dispersion delivery system did not include a gear pump which could introduce such pressure, and thus caliper fluctuations.

It has now been discovered that a pressure-controlling dispersion delivery system used in combination with a shear device, preferably a high intensifier shear system, will result in consistent delivery of high pressure fluid to a coating device, even in a low flow system. Pressure-controlling dispersion delivery devices can be provided using proportional integral delivery (PID) control loop.

SUMMARY OF THE INVENTION

The invention provides a pressure-controlling dispersion delivery system, and a method of uniformly delivering a sheared dispersion to a coating device, wherein at least one coated layer formed from the dispersion shows substantially less variation in caliper than conventional delivery and coating methods. The dispersion delivery system of the invention is a pressure-controlling dispersion delivery system selected from a direct feed delivery system and a coating device flow-through delivery system.

In one aspect of the invention, a pressure-controlling dispersion delivery system is provided for moving a sheared dispersion to a coating device, said delivery system selected from the group consisting of a direct feed delivery system and a coating device flow-through delivery system, wherein a coating formed from a dispersion delivered via such system has a more consistent caliper than a coating formed from a similar sheared dispersion delivered to a coating device by means of a gear pump delivery system. The pressure-controlling delivery system may employ a proportional integral derivative control loop as a pressure-control means.

In one embodiment, the invention provides a direct feed pressure-controlling dispersion delivery system for delivering a sheared dispersion comprising a pressure regulator located between the shearing device and the coating device, selected from a back pressure regulator and a pressure reducing regulator, where the regulator employs a proportional integral derivative control loop having at least one feedback point.

In an alternative embodiment of the pressure-controlling dispersion delivery system, the invention provides a coating device flow-through delivery system having at least one reflow path which returns excess dispersion to the delivery system, and at least one back pressure regulator therefor. The determination of excess flow may be controlled by a proportional integral derivative loop including at least one feedback point.

Useful embodiments of coating device flow-through delivery systems include a single feed/single return system and a single feed/dual return system having at least one reflow path to return excess dispersion from the coating device back to the delivery system to be reprocessed or directly returned to the coating device.

The invention also provides a method for use of a pressure-controlling dispersion delivery system which delivers a consistent portion of coating composition to the web by diverting excess dispersion to be reprocessed prior to shearing of the composition for coating, which extends pot life of the composition and reduces wastage as well as providing coatings having more consistent thicknesses, or calipers.

In another aspect, the invention provides a method for coating a flexible support with at least one magnetic recording composition to form a magnetic recording medium, comprising the steps of:
  a) forming a coating dispersion from a mixture of ingredients including at least one finely divided metal particulate material in the presence of a solvent,
  b) shearing the dispersion through a high intensifier shear system,
  c) delivering the coating dispersion to a coating device by means of a pressure-controlling dispersion delivery system selected from the group consisting of a direct feed delivery system and a coating device flow-through delivery system,
  d) coating the composition onto the flexible support or atop a layer previously coated onto the flexible support, wherein a coating formed from a dispersion delivered via such system has a more consistent caliper than a coating formed from a similar sheared dispersion delivered to a coating device by means of a gear pump delivery system.

In another aspect of the invention, a fluid coating system is provided comprising a high intensifier shear system and a pressure-controlling dispersion delivery system. The pressure-controlling dispersion delivery device of the invention is selected from a direct feed delivery system and a coating device flow-through delivery system.

As used herein, these terms have the following meanings:
1. The term "pressure-controlling" means that the system has the ability to control the pressure and the flow of a sheared dispersion through the system to a coating device.
2. The term "back pressure" refers to pressure in the direction opposite the flow direction of the coating dispersion.
3. The term "direct feed" means that there is no pump between the shear apparatus and the coating device.
4. The term "coating device flow through" means that a portion of the total dispersion flow entering the coating device leaves the coating apparatus without being utilized. Preferably this unused dispersion is returned to the dispersion delivery system for reuse.
5. The term "pot life" means the length of time which a coating composition may remain in the processing equipment before deterioration or change in properties.
6. The term "more consistent caliper" means that there is less variation in the coating caliper for the designated coating than for another similar dispersion coated with a conventional delivery system.
7. The term "pressure-reducing regulator" refers to a regulator that provides consistent forward flow of the dispersion.

All portions, percents and ratios herein are by weight unless otherwise specifically stated.

DETAILED DESCRIPTION OF THE PREFERRED EMBODIMENTS

Figure 1:
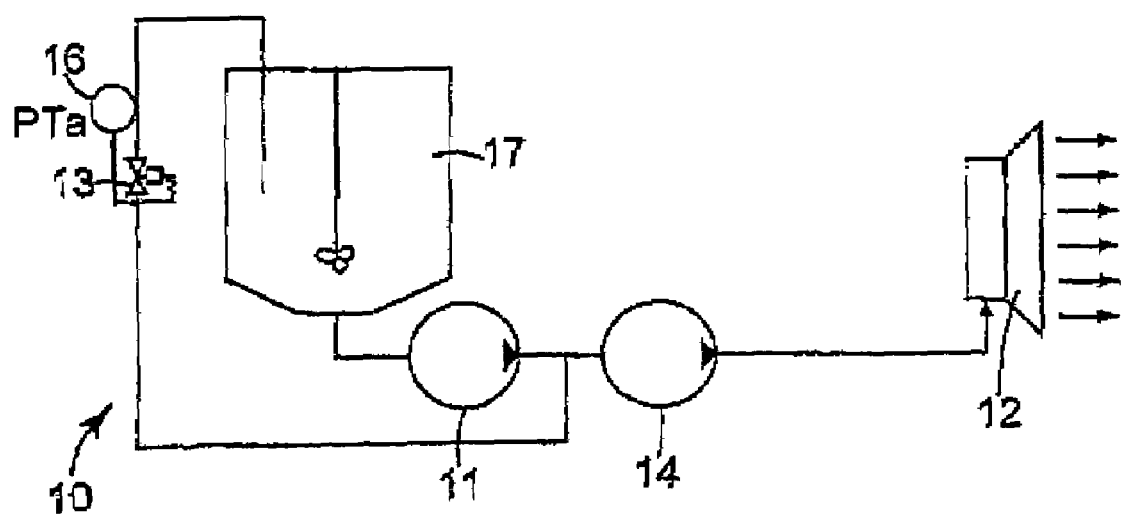
FIG. 1 is a schematic representation of a conventional dispersion delivery system.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Generally, pressure-controlling delivery systems are provided which deliver dispersions to coating devices with even pressure for even low flow manufacturing systems, allowing the dispersions to be coated without significant variation in thickness over the coating area. These delivery systems provide more even coatings, and thus higher quality coatings than similar sheared dispersions delivered via conventional gear pumps. In fluid coating systems of the invention, preferred shearing systems are high intensifier shear systems.

In one specific embodiment, a method for forming at least one coating suitable for use as a magnetic recording medium uses a pressure-controlling dispersion delivery device of the invention.

Pressure-Controlling Dispersion Delivery System

The apparatus for full manufacture of a coating or series of coatings includes ingredient holding device(s), mixing apparatus, shearing apparatus, a pressure-controlling delivery system, a coating device, drying and orienting devices and one or more calendaring devices. Such devices are, typically but not always, arranged in a manufacturing "line", with the ingredients moving from one device to the next until the product manufacture is complete, or substantially complete.

The manufacturing process begins by providing the raw ingredients, and making them into one or more dispersions to be coated. The formulation(s) may be mixed and kneaded concurrently or sequentially, as desired, depending on such factors as the apparatus and the pot life of the ingredients. The formulation portion of the manufacturing apparatus includes hoppers for various ingredient addition, at least one mixer, and one or more reservoirs for holding the mixed dispersion, which may be arranged in various order, depending on the exact formulation to be used.

Once the dispersion is complete, it is ready to go to the shearing apparatus. Any known shearing apparatus may be used in conjunction with the pressure-controlling dispersion delivery system of the invention. For maximum control of the dispersion, a hydraulic high intensifier shear system is used. A preferred high intensifier shear system is disclosed in U.S. Pat. No. 6,558,134, incorporated herein by reference.

One high intensifier shear system useful in conjunction with the pressure-controlling dispersion delivery system of the invention uses a low pressure supply pump to feed into a charge intensifier pump through a controllable check valve. The charge intensifier pump then delivers the material at a much higher pressure to one of a plurality of product intensifier pumps, which are configured so that some of the pumps are essentially out of phase with one another. For example, in a system having two product intensifier pumps, one is advancing and delivering product while the other is retracting and preloading. During this retraction of the product intensifier pump, it is being filled with product so that during the subsequent advance stroke, material is expelled. At the end of an advance cycle, material is allowed to enter the product intensifier pump from the charge intensifier pump. The material is delivered at a relatively high pressure so that the product intensifier pump will retract at a relatively high speed. Thus, the charge intensifier pump increases the speed of the retraction stroke of the product intensifier pump. The charge intensifier pump has a larger product displacement per stroke than that of the individual product intensifier pumps, so it fills one or more of the product intensifier pumps with each stroke. The charge does so without introducing air, aiding in the control and elimination of pulsation during the shearing step. Even after fully retracting, material is still delivered from the charge intensifier pump to the barrel of the product intensifier pump, causing the material within the product intensifier pump to have increased pressure. This reduces the amount of time that the product intensifier pump needs to preload or precompress the dispersion before the advance stroke begins to deliver product. The product intensifier pump then begins its advance cycle, delivering product. Simultaneously, or close to simultaneously, another product intensifier pump is retracted by the delivery of product from the charge intensifier pump. In this manner, sheared dispersion is substantially constantly and consistently delivered by the product intensifier pump(s), as their pistons are retracted quickly with the aid of the charge intensifier pump. The efficiency is increased due to the reduction in the preload period.

Various sensors can be also positioned to determine the position of each of the pistons in the product intensifier pump and the charge intensifier pump and the output of such sensors is provided to controllers which actively control the functioning of check valves throughout the system. The controller determines from the sensor output whenever a particular intensifier pump is near the end of a cycle, and opens or closes the appropriate valve in anticipation of the completion of the cycle, increasing the efficiency of the system.

Figure 2:
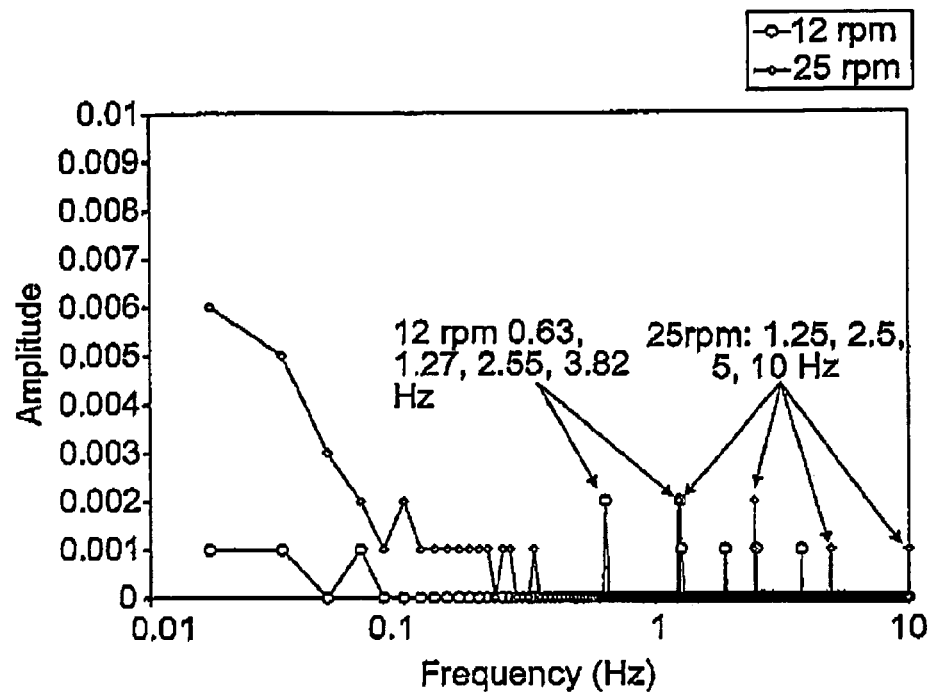
FIG. 2 is a graph-showing frequency of cyclic pressure fluctuations in a conventional dispersion delivery system using a pump.

After the dispersion has been sheared, it passes into a delivery system for delivery to a coating device. In the conventional dispersion system 10 shown in the schematic of FIG. 1, high pressure shearing device 11 pressurizes the dispersion. The flow leaving the high pressure shearing device 10 is in excess of the amount of flow required at the coating die 12. The flow leaving the high pressure shearing device 11 moving to the gear pump 14 is regulated by a back pressure regulator 13. The pressure is set such that gear pump 14 has adequate flow, but not enough to bypass the flow metering feature of the gear pump. The pressure can be monitoring at pressure transmitter 16. The gear pump meters flow through the filter. During coating, none of the flow downstream of gear pump 14 returns to the reservoir. While gear pump 14 delivers a generally uniform flow, there are still pressure fluctuations in the dispersion being delivered to the die as shown by the graph of FIG. 2. The pressure fluctuation varies with changes to the rotation rate of the gear pump. Therefore, elimination of gear pump 14 would be desirable to reduce this contribution to the pressure fluctuations. Use of certain direct feeding systems eliminates the need for gear pump 14.

Figure 3:
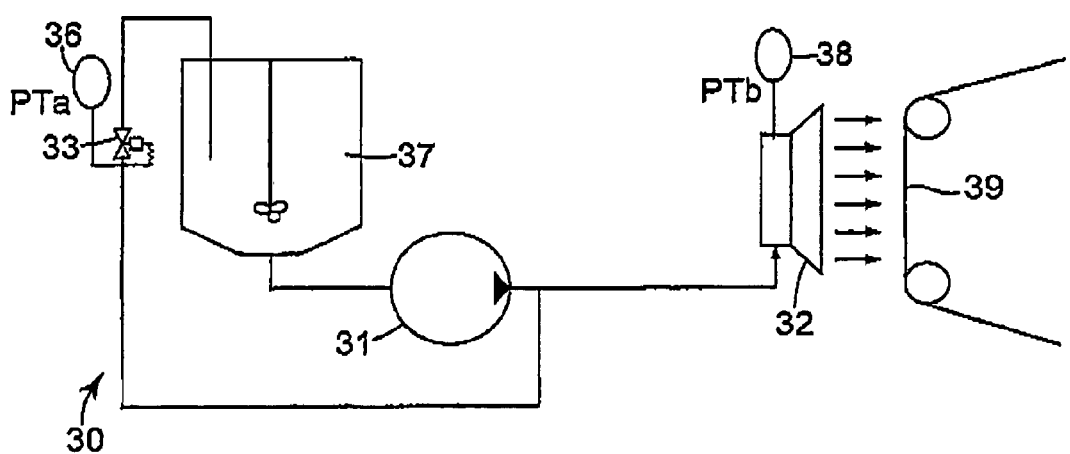
FIG. 3 is a schematic representation of a direct feed pressure-controlling dispersion delivery system of the invention.

FIG. 3 is a schematic of a direct flow pressure-controlling dispersion delivery system 30 which utilizes a proportional integral derivative (PID) control loop to control the pressure and thus die flow rate to coating die 32. The back pressure regulator 33 reduces pressure fluctuations to coating die 32. The feedback for the PID control loop is taken at pressure transmitter point a, 36 or pressure transmitter point b, 38. No return of formulation to the reservoir occurs during the flow to coating die 32. The formulation flows into coating die 32 and is coated onto flexible support 39.

Figure 4:
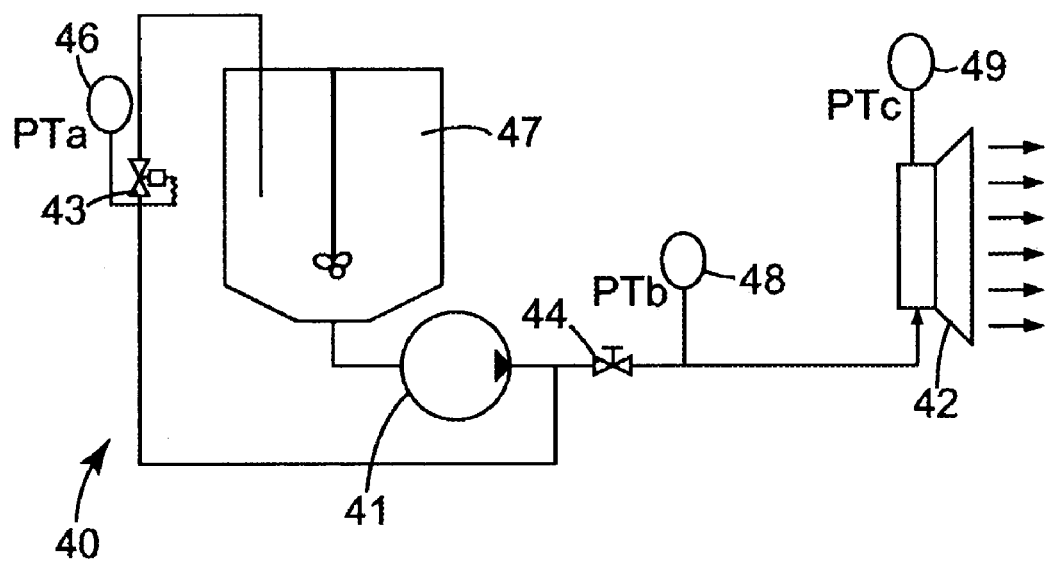
FIG. 4 is a schematic representation of an alternative direct feed delivery system of the invention.

FIG. 4 shows an alternative direct feed arrangement, utilizing adjustable metering valve 44. The flow exits from high pressure shearing device 41. Back pressure regulator 43 is set at a higher pressure, e.g., 40 psig, than is desired at coating die 42. Adjustable metering valve 44 uses a remotely adjustable orifice to present a fixed pressure drop. The orifice size can be adjusted depending on the flow rate desired at coating die 42. Again no flow back to the reservoir 47 occurs during the flow. The electronic feed back to the PID control back pressure regulator 43 could come from pressure transducers placed at pressure transmitter a 46, pressure transmitter b 48, or pressure transmitter c 49.

Figure 5:
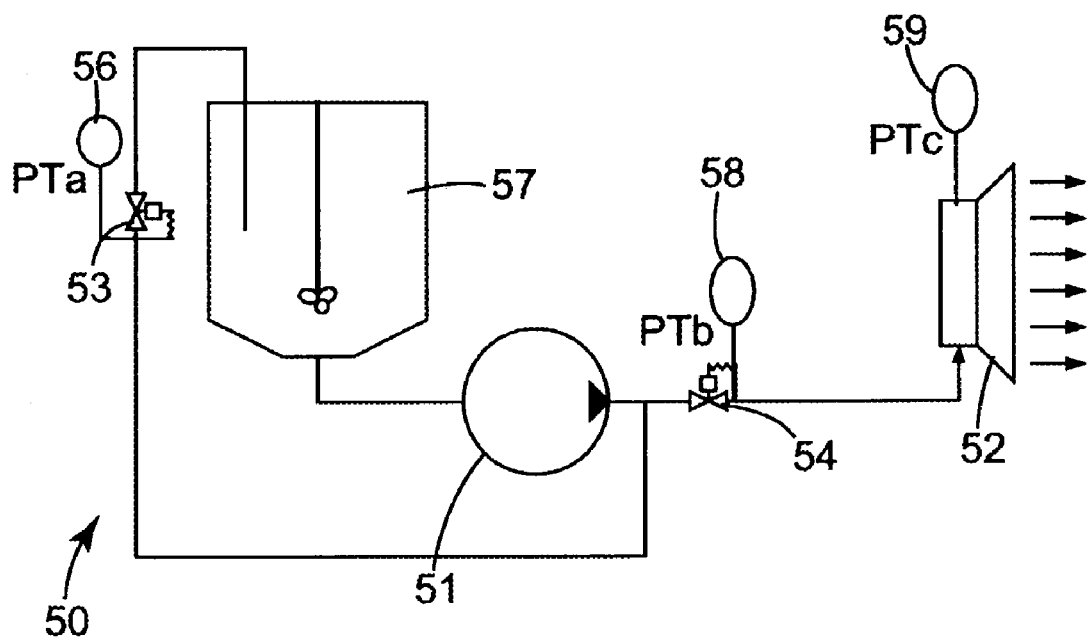
FIG. 5 is a schematic representation of a delivery dispersion system using a back pressure regulator and a pressure reducing regulator.

FIG. 5 displays one direct feed pressure-controlling dispersion delivery system arrangement 50 that eliminates use of a gear pump through use of a back pressure regulator 53 and a pressure reducing regulator 54. The flow exits the shear apparatus and splits into two streams. One stream feeds into the pressure reducing regulator 54, and the other feeds into the back pressure regulator 53. These two regulators 53 and 54 keep a constant pressure to inlet of coating die 52. Both regulators utilize electronic PID control algorithms. Measurements can be taken, or electronic feed back to the PID control back pressure regulator 53 can come from pressure transducers placed at pressure transmitter a 58, pressure transmitter b 59. No flow back to the reservoir 57 occurs during the dispersion flow.

Figure 6:
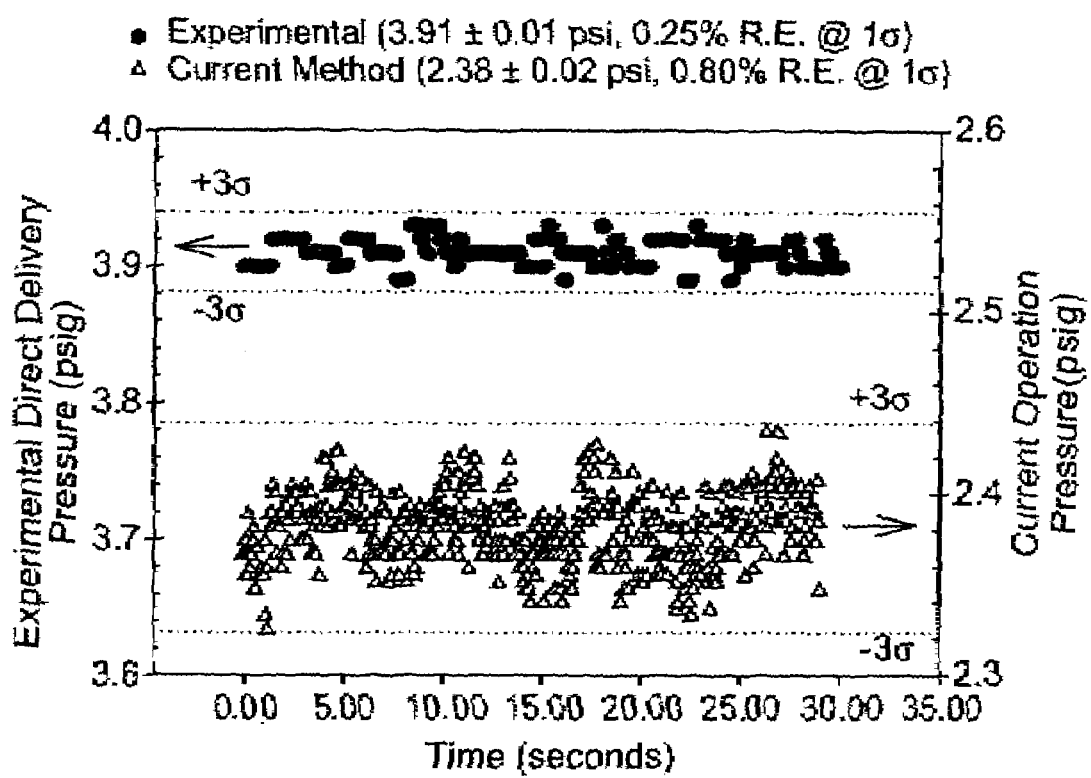
FIG. 6 is a graph comparing the pressure fluctuations of a direct feed pressure-controlling dispersion delivery system to a conventional delivery system.

FIG. 6 is a graph which shows the significant reduction in pressure fluctuation resulting from use of one of the direct feed pressure-controlling dispersion delivery systems described above.

Figure 7:
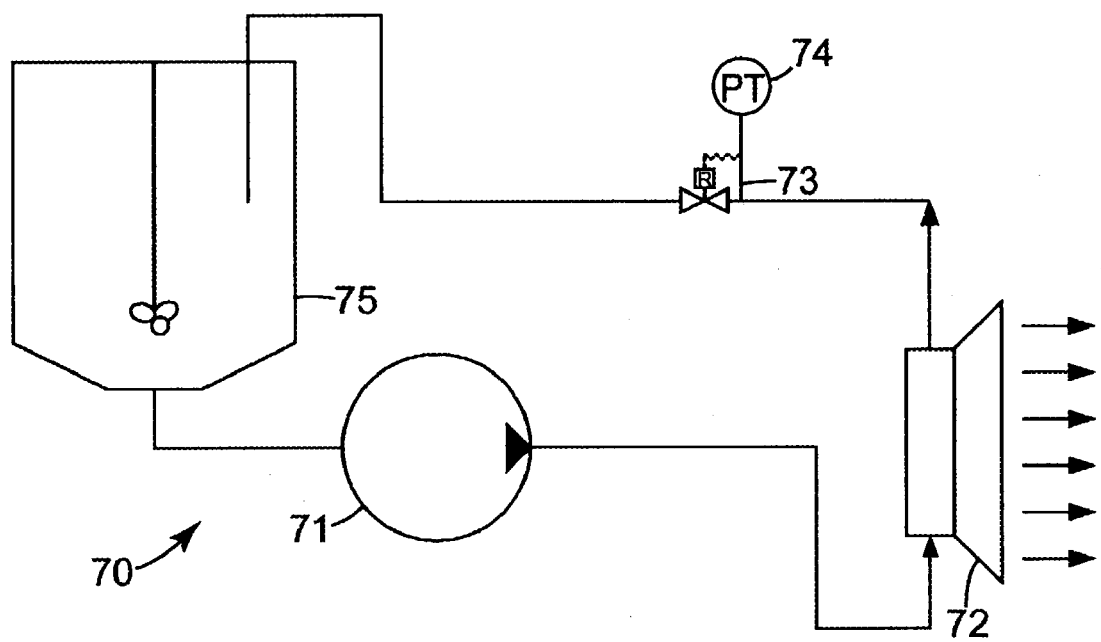
FIG. 7 is a schematic representation of a single feed/single return coating device flow-through delivery system.

FIG. 7 is a schematic of a single feed/single return type of a coating device flow-through pressure-controlling dispersion delivery system 70 which utilizes a PID control loop to control the pressure on the dispersion after it is expelled from the high intensifier shear system 71 and thus controls the flow rate to coating die 72. Another visible benefit of eliminating the gear pump is that the time between shear and coating is reduced. The back pressure regulator 73 reduces pressure fluctuations to coating die 72. The feedback for the PID control loop is taken by means of a pressure transmitter 74 on the back pressure regulator 73. Excess amounts of sheared dispersion are returned to the reservoir 75 for reshearing and flow back to coating die 72.

Figure 8:
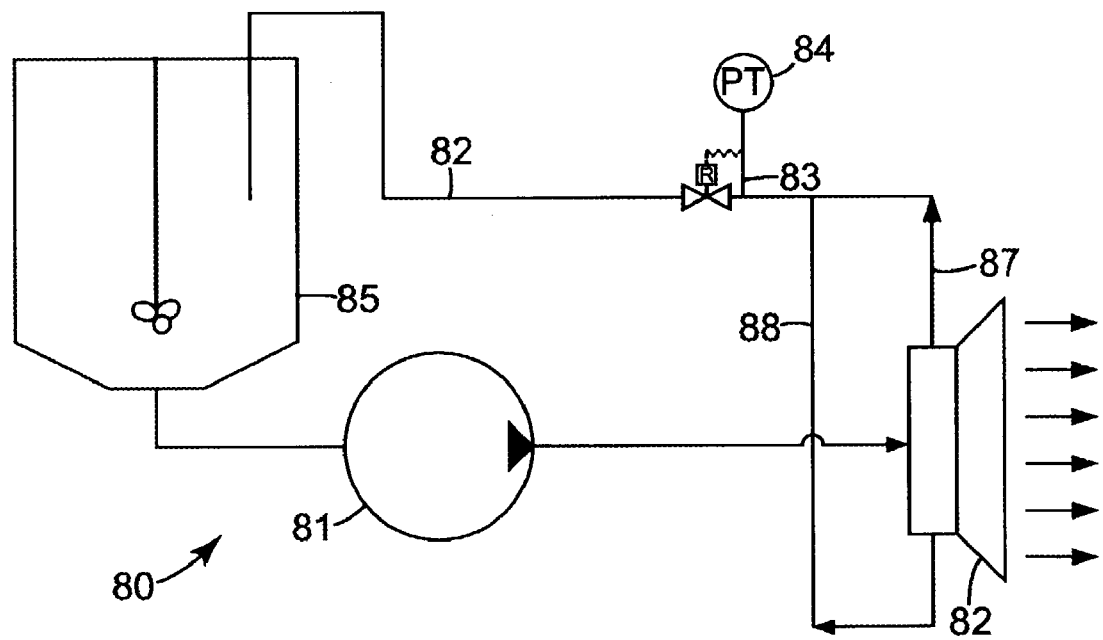
FIG. 8 is a schematic representation of a single feed/dual return coating device flow-through delivery system.

FIG. 8 is a schematic of a single feed/dual return type of a coating device flow-through pressure-controlling dispersion delivery system 80 which also utilizes a PID control loop to control the pressure on the dispersion after it is expelled from the high intensifier shear system 81 and thus controls the flow rate to coating die 82. The back pressure regulator 83 reduces pressure fluctuations to coating die 82. The feedback for the PID control loop is taken by means of a pressure transmitter 84 on the back pressure regulator 83. Excess amounts of sheared dispersion are returned to the reservoir 85 for reshearing through a first reflow path 87 or a second reflow path 88. After reshearing, the dispersion flows back to coating die 82. Determination of the reflow path is controlled by the pressure transmitter 84 using the proportional integral derivative algorithm. In this embodiment, a dual return system is utilized. In such a system, the flow rate of the dispersion through the die is increased, and the flow rate coated to the web is controlled by adjusting the back pressure, resulting in reduced time between the shearing step and the coating step (due to the lower residence time in the delivery system due to the higher flow rate). Shorter residence times in the dispersion delivery system reduce the potential for the dispersion to re-agglomerate after the shearing step.

Figure 9:
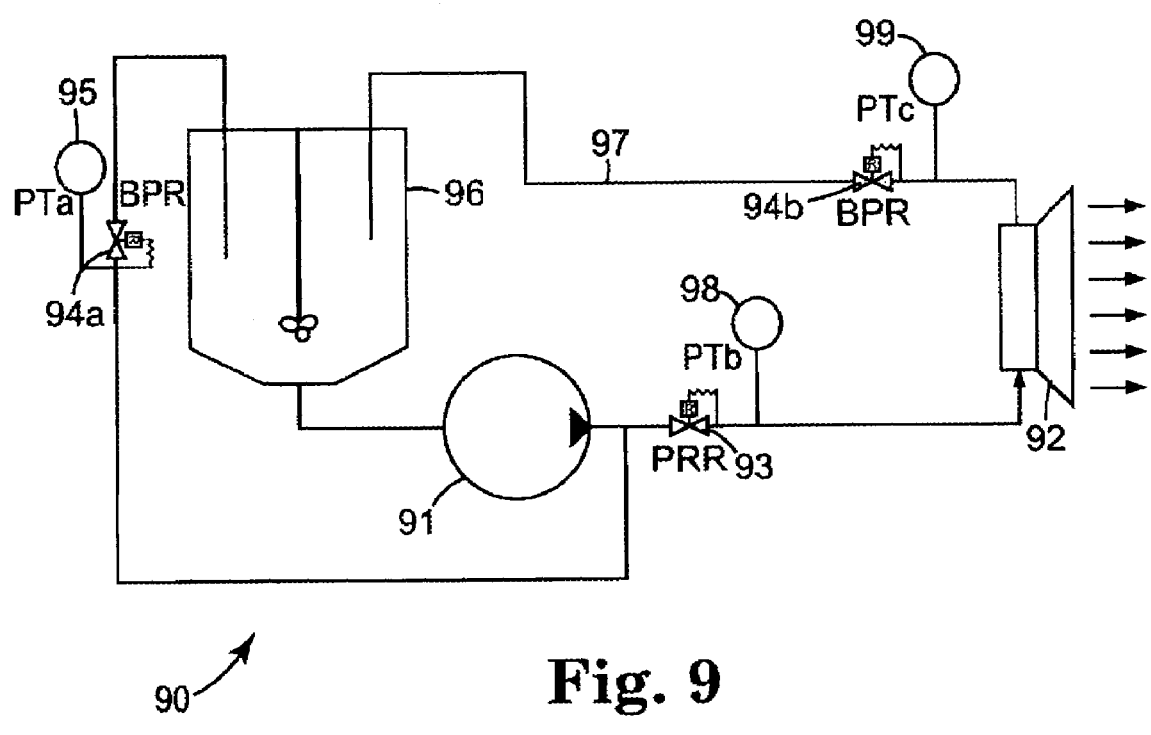
FIG. 9 is a schematic representation of a hybrid pressure-controlling dispersion delivery system.

FIG. 9 shows a hybrid pressure-controlling delivery system including both direct feed and coating device flow-through elements. Hybrid delivery system 90 utilizes a PID control loop to control the pressure on the dispersion after it is expelled from the high intensifier shear system 91 and thus control the flow rate to coating die 92. Pressure regulators 93, 94a, and 94b reduce pressure fluctuations to coating die 92 and control flow rate to coating die 92 and to reservoir 96. The feedback for the PID control loop is taken by means of pressure transmitter 98 on the pressure reducing regulator 93 and pressure transmitter 99 on the back pressure regulator 94b. Pressure transmitter 95 provides feedback for 94a. Excess amounts of sheared dispersion are either returned to the reservoir 96 for reshearing through a first reflow path 97 and subsequent flow back to coating die 92. Determination of the reflow path is controlled by the pressure transmitters 98, 99 using the proportional integral derivative algorithm. A hybrid system having both direct feed and flow-through features may provide even more tightly controlled dispersion pressure to provide optimized caliper delivery with little, if any, caliper variations.

Coating methods such as extrusion coating, gravure coating, roll coating, knife-coating or the like may be used as the coating device. For coatings of extremely thin calipers, extrusion dies are commonly used coating devices.

In many coating processes, the layers are coated by means of the coating device onto a substrate. In another manufacturing process, one or more layers are coated onto a liner such as a release liner to be dried or cured and becoming self-supporting films. Either process includes unwinding material to be used as the liner or substrate from a spool or supply. If multiple layers are to be formed, an upper layer may be coated onto a dry sub-layer, or the layers may be coated wet-on-wet, as desired for the specific application.

After the coatings are completed, the coated substrate or liner is transported from the coating station to the drying station, typically to an oven where the coating is dried.

After the coating is dried, it is conveyed to final processing apparatus such as calendaring devices, converting devices, and the like, which may be in-line or off-line. According to one embodiment, both in-line and off-line calendaring devices are used, and the in-line calendering station uses one or more in-line nip rolls in each of which a steel or other generally non-compliant roll contacts or otherwise is applied to the coated side of the substrate or liner and a steel or rubberized or other generally compliant roll is applied to the opposing side. After in-line calendaring, the substrate or other material is wound.

The process then optionally proceeds to any off-line post-processing stations. Off-line stations, if used, may consist of a stand-alone machine in the same facility or may be at a second location. The coated substrate or liner is unwound and subjected to further processing or conversion into final products.

Magnetic Recording Medium Coating Formulations

In one specific embodiment, the dispersion(s) to be coated have formulations which are appropriate to magnetic recording media, especially multi-layered magnetic recording media.

In such multi-layer recording media, the upper layer of the individual medium is a magnetic recording layer. The magnetic recording layer is a thin layer, being preferably from about 5 microinches (0.013μ) to about 10 microinches (0.25μ) in thickness, preferably from about 5 to about 8 microinches.

The magnetic metal particle pigments have a composition including, but not limited to, metallic iron and/or alloys of iron with cobalt and/or nickel, and magnetic or non-magnetic oxides of iron, other elements, or mixtures thereof. Alternatively, the magnetic particles can be composed of hexagonal ferrites such as barium ferrites. In order to improve the required characteristics, the preferred magnetic powder may contain various additives, such as semi-metal or non-metal elements and their salts or oxides such as Al, Co, Y, Ca, Mg, Mn, Na, etc. The selected magnetic powder may be treated with various auxiliary agents before it is dispersed in the binder system, resulting in the primary magnetic metal particle pigment. Preferred pigments have an average particle length no greater than about 100 nanometers (nm), preferably no more than about 80 nm. Such pigments are readily commercially available from companies such as Toda Kogyo, KDK, and Dowa Mining Company. In addition to the preferred primary magnetic metal particle pigment described above, the metal particle pigment of the upper layer further includes carbon particles.

The magnetic upper layer also includes an abrasive or head cleaning agent (HCA) component. One preferred HCA component is aluminum oxide. Other abrasive grains such as silica, $ZrO_2$, $Cr_2O_3$, etc., can also be employed, either alone or in mixtures with aluminum oxide or each other.

The binder system associated with the upper layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the upper layer includes a combination of a primary polyurethane resin and a vinyl chloride resin. Examples of polyurethanes include polyester-polyurethane, polyester-polyurethane, polycarbonate-polyurethane, polyester-polycarbonate-polyurethane, and polycaprolactone-polyurethane. Other acceptable vinyl chloride resins such as vinyl chloride-vinyl acetate copolymer, vinyl chloride-vinyl acetate-vinyl alcohol copolymer, and vinyl chloride-vinyl acetate-maleic anhydride can also be employed with the primary polyurethane binder. Resins such as bis-phenyl-A-epoxy, styrene-acrylonitrile, and nitrocellulose may also be acceptable.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable.

The magnetic upper layer may further contain one or more lubricants such as a fatty acid and/or a fatty acid ester. The incorporated lubricant(s) exist throughout the front coating and, importantly, at the surface of the upper layer. The lubricant(s) reduces friction to maintain smooth contact with low drag and protects the media surface from wear.

The binder system may also contain a hardening agent such as isocyanate or polyisocyante. In a preferred embodiment, the hardener component is incorporated into the upper layer in an amount of 2 to 5 parts by weight, and preferably 3 to 4 parts by weight, based on 100 parts by weight of the primary magnetic pigment. Useful solvents associated with the upper layer coating material preferably include cyclohexanone (CHO), with a preferred concentration of from about 5% to about 50%, methyl ethyl ketone (MEK) preferably having a concentration of from about 30% to about 90%, and toluene, having a concentration of from about 0% to about 40%.

The lower layer of a dual layer magnetic tape is essentially non-magnetic and typically includes a non-magnetic or soft magnetic powder, and a resin binder system. By forming the lower layer to be essentially non-magnetic, the electromagnetic characteristics of the upper magnetic layer are not adversely affected. However, to the extent that it does not create any adverse affect, the lower layer may contain a small amount of a magnetic powder.

The pigment or powder incorporated in the lower layer includes at least a primary pigment material and conductive carbon black. The primary pigment material consists of particles having a coercivity of less than 300 Oe coated with an electroconductive material. Non-magnetic particles such as iron oxides, titanium dioxide, titanium monoxide, alumina, tin oxide, titanium carbide, silicon carbide, silicon dioxide, silicon nitride, boron nitride, etc., or soft magnetic particles having a coercivity of less than 300 Oe, can be provided in a form coated with carbon, tin, or other electroconductive material and employed as lower layer pigments. In a preferred embodiment, the primary lower layer pigment material is a carbon-coated hematite material ($\alpha$-iron oxide), which can be acidic or basic in nature. A binder system or resin similar to that used as a binder for the magnetic layer is also included in the support layer.

The substrate can be any conventional non-magnetic substrate. Exemplary substrate materials useful for magnetic recording tapes include polyesters such as polyethylene terephthalate, polyethylene naphthalate, polyolefins (e.g., polypropylene); cellulose derivatives; polyamides, polyimides and mixtures thereof.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A pressure-controlling dispersion delivery system for delivering a sheared dispersion comprising a plurality of ingredients to a coating device, said pressure-controlling delivery system being selected from a direct feed delivery system wherein said system includes no gear pumps, and a coating device flow-through delivery system, said delivery system further comprising a proportional integral derivative control loop having at least one feedback point.

2. A pressure-controlling dispersion delivery system according to claim 1 wherein said pressure-controlling delivery system comprises a direct feed system wherein a flow of said sheared dispersion is controlled by at least one pressure regulator located between a shearing device and said coating device, said pressure regulating mechanism selected from a back pressure regulator and a pressure reducing regulation.

3. A pressure-controlling dispersion delivery system according to claim 2 wherein said direct feed system comprises at least one back pressure regulator.

4. A pressure-controlling dispersion delivery system according to claim 2 wherein said direct feed system comprises a plurality of back pressure regulators.

5. A pressure-controlling dispersion delivery system according to claim 1 wherein said at Least one feedback point includes a pressure transmitter.

6. A pressure-controlling dispersion delivery system according to claim 2 wherein said direct feed system comprises at least one pressure reducing regulator.

7. A pressure-controlling dispersion delivery system according to claim 3 wherein said direct feed system further comprises at least one adjustable metering valve.

8. A pressure-controlling dispersion delivery system according to claim 2 wherein said coating device is a coating die.

9. A pressure-controlling dispersion delivery system according to claim 1 wherein said delivery system comprises a coating device flow-through system including at least one back pressure regulator, said system including at least one reflow path.

10. A pressure-controlling dispersion delivery system according to claim 9 wherein said coating device is a coating die.

11. A pressure-controlling dispersion delivery system according to claim 9 wherein said coating device flaw-through system delivery system comprises a single feed/single return system including one reflow path.

12. A pressure-controlling dispersion delivery system according to claim 9 wherein said coating device flow-through system delivery system comprises a single feed/dual return system including two reflow paths.

13. A pressure-controlling dispersion delivery system according to claim 9 wherein said coating device flow-through system comprises a plurality of back pressure regulators.

14. A pressure-controlling dispersion delivery system according to claim 13 wherein said at least one back pressure regulator further includes a pressure transmitter.

15. A pressure-controlling dispersion delivery system according to claim 14 wherein said pressure transmitter is controlled by means of a proportional integral derivative loop.

16. A pressure-controlling dispersion delivery system according to claim 9 wherein a reflow path returns dispersion to a reservoir.

17. A fluid coating system for coating at least one layer onto flexible substrate comprising a hydraulic shear system and a pressure-controlling dispersion delivery system selected from a direct feed delivery system wherein said pressure control is provided by at least one pressure control device selected from pressure regulators, pressure transmitters and metering valves and a coating device flow-trough delivery system.

18. A fluid coating system according to claim 17 wherein said system comprises at least one back pressure regulator.

* * * * *